United States Patent
Zhang et al.

(10) Patent No.: US 9,843,567 B2
(45) Date of Patent: Dec. 12, 2017

(54) WIRELESS NETWORK SERVICE PROVISION METHOD AND SYSTEM

(71) Applicant: Beijing Zhigu Rui Tuo Tech Co., Ltd, Beijing (CN)

(72) Inventors: Hongjiang Zhang, Beijing (CN); Weicai Huang, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 12 days.

(21) Appl. No.: 14/783,082

(22) PCT Filed: Dec. 10, 2013

(86) PCT No.: PCT/CN2013/088927
§ 371 (c)(1),
(2) Date: Oct. 7, 2015

(87) PCT Pub. No.: WO2015/027612
PCT Pub. Date: Mar. 5, 2015

(65) Prior Publication Data
US 2016/0173469 A1    Jun. 16, 2016

(30) Foreign Application Priority Data
Aug. 30, 2013    (CN) .......................... 2013 1 0389042

(51) Int. Cl.
*H04L 29/06* (2006.01)
*H04W 12/06* (2009.01)
*H04W 4/02* (2009.01)

(52) U.S. Cl.
CPC .......... *H04L 63/08* (2013.01); *H04L 63/0815* (2013.01); *H04L 63/10* (2013.01);
(Continued)

(58) Field of Classification Search
CPC ........... G06F 2221/2111; H04L 63/107; H04L 63/0492; H04W 4/021; H04W 4/025
See application file for complete search history.

(56) References Cited

U.S. PATENT DOCUMENTS

| | | |
|---|---|---|
| 6,978,023 B2 | 12/2005 | Dacosta |
| 7,487,112 B2 | 2/2009 | Barnes |

(Continued)

FOREIGN PATENT DOCUMENTS

| | | |
|---|---|---|
| CN | 101187701 A | 5/2008 |
| CN | 102484593 A | 5/2012 |

(Continued)

OTHER PUBLICATIONS

Rahimi et al., "Indoor Geo-fencing and Access Control for Wireless Networks", 2013, pp. 1-8.*

(Continued)

*Primary Examiner* — Thaddeus Plecha
(74) *Attorney, Agent, or Firm* — Amin, Turocy & Watson, LLP

(57) ABSTRACT

Provision of a wireless network service is described in relation to network security. Automatic authentication is performed on an object entering a first area, and when the object passing the authentication in the first area enters a second area, the object is authorized to obtain a network service. An area (e.g., a first area) where a Wireless Local Area Network (WLAN) is used securely is divided, so that after an object device completes automatic authentication in this area, to the object can be directly authorized in a larger area (a second area) to obtain the network service. In this case, both security and convenience of use of the WLAN are considered.

37 Claims, 2 Drawing Sheets

(52) U.S. Cl.
CPC ........... *H04L 63/107* (2013.01); *H04W 4/021* (2013.01); *H04W 12/06* (2013.01); *G06F 2221/2111* (2013.01); *H04W 4/025* (2013.01); *H04W 4/027* (2013.01)

(56) References Cited

U.S. PATENT DOCUMENTS

| | | | |
|---|---|---|---|
| 2002/0094777 A1* | 7/2002 | Cannon | H04L 63/107 455/41.2 |
| 2004/0090930 A1 | 5/2004 | Lee et al. | |
| 2004/0190718 A1* | 9/2004 | Dacosta | H04L 63/0492 380/247 |
| 2004/0203748 A1* | 10/2004 | Kappes | H04L 12/2856 455/432.1 |
| 2006/0107307 A1* | 5/2006 | Knox | H04L 63/0492 726/2 |
| 2008/0209521 A1* | 8/2008 | Malaney | H04L 63/0492 726/4 |
| 2009/0187492 A1 | 7/2009 | Hammad et al. | |
| 2011/0030037 A1* | 2/2011 | Olshansky | H04L 12/4641 726/4 |
| 2011/0040823 A1* | 2/2011 | Liu | H04L 67/16 709/203 |
| 2011/0061016 A1* | 3/2011 | Song | H04L 63/107 715/779 |
| 2012/0135711 A1* | 5/2012 | Jabara | H04L 63/0876 455/411 |
| 2013/0007868 A1* | 1/2013 | Hoggan | H04L 9/3263 726/8 |
| 2013/0046635 A1* | 2/2013 | Grigg | G06Q 30/0238 705/14.58 |
| 2013/0185166 A1* | 7/2013 | Larkin | G06Q 20/20 705/21 |
| 2014/0082713 A1* | 3/2014 | Markel | H04L 63/08 726/7 |
| 2014/0274122 A1* | 9/2014 | Tseng | G01S 19/14 455/456.1 |

FOREIGN PATENT DOCUMENTS

| | | |
|---|---|---|
| CN | 102711110 A | 10/2012 |
| CN | 102869014 A | 1/2013 |
| CN | 102883320 A | 1/2013 |
| GB | 2389010 A | 11/2003 |
| WO | 2004004278 A1 | 1/2004 |

OTHER PUBLICATIONS

International Search Report dated Jul. 9, 2014 for PCT Application No. PCT/CN2013/088927, 4 pages.

* cited by examiner

WIRELESS NETWORK SERVICE PROVISION METHOD AND SYSTEM

CROSS-REFERENCE TO RELATED APPLICATIONS

This application is a U.S. National Stage filing under 35 U.S.C. §371 of international patent cooperation treaty (PCT) application No. PCT/CN2013/088927, filed Dec. 10, 2013, and entitled "WIRELESS NETWORK SERVICE PROVISION METHOD AND SYSTEM," which claims priority to Chinese Patent Application No. 201310389042.4, filed with the Chinese Patent Office on Aug. 30, 2013 and entitled "WIRELESS NETWORK SERVICE PROVIDING METHOD AND SYSTEM", which applications are hereby incorporated herein by reference in their respective entireties.

TECHNICAL FIELD

The present application relates to the technical field of network security, and in particular, to provision of a wireless network service.

BACKGROUND

The Wireless Local Area Network (Wireless Local Area Network, WLAN) is widely used at home, in small-scale office and business places. In the WLAN, a terminal accesses the WLAN through a routing device, and uses the wireless network service. However, research shows that a wireless routing device is easily attacked, and cannot protect security of a user network and digital properties.

A typical process of a wireless terminal accessing the WLAN is: Firstly, on each possible WLAN broadcast channel, intercept beacon (Beacon) information sent by a WIFI access point ((Access Point, AP), including a WIFI wireless router), and if a proper AP is found, start an access process. The access process includes: authentication (Authentication) and association (Association). The authentication is performed so as to ensure that only an authorized user can access the network, and in an authentication process, usually a user access password needs to be input. The association is performed so as to determine a capability supported by a terminal, and agree on a parameter used when two parties communicate with each other. After the access process is completed, a process of establishing a connection between the terminal and the AP is completed. Due to openness of an air interface, theoretically, all information transmitted over the air can be thieved, and then decrypted in various manners to obtain a network access password, an information transmission encryption password, and the like. A typical security problem in the access process of the WLAN is that the access password in the authentication process may be thieved illegally.

An existing location-based authentication technology can partially solve the problem that key information is thieved illegally. By using this technology, when a mobile terminal sends a wireless access request, a spatial location of the mobile terminal is determined, and if it is located within a preset wireless network range, the mobile terminal is allowed to access the network. Especially, the location-based authentication technology can protect, to some extent, important information transmitted over the air in the authentication stage. However, in the prior art, an area where authentication is allowed to be completed generally is an area where the network service can be obtained, which brings the following contradictions:

from the perspective of network coverage (or use convenience of the network), a user hopes that it is convenient as much as possible when accessing the WLAN, that is, the user hopes that an area where the location-based authentication is allowed is large enough; and from the perspective of security, it is required that the authentication area is small enough, so as to ensure that the area is a secure area that can be controlled completely.

Therefore, the objective of improving the security of the WLAN contradicts the objective of improving the use convenience of the WLAN.

SUMMARY

Various embodiments described herein provide a wireless network service, which can consider both security and use convenience of a WLAN.

In a first aspect, an embodiment of the present application provides a wireless network service providing method, including performing automatic authentication on an object entering a first area; and when the object passing the authentication in the first area enters a second area, authorizing the object to obtain a network service.

In a second aspect, an embodiment of the present application provides a wireless network service providing system, where the system includes: an authentication module, configured to perform automatic authentication on an object entering a first area, and authorize the object passing the authentication in the first area to obtain a network service in a second area.

In a third aspect, an embodiment of the present application provides a computer program product, where the computer program product enables a wireless network service providing system to execute the method according to the first aspect or any possible implementation manner of the first aspect.

In a fourth aspect, an embodiment of the present application provides a computer readable medium, where the computer readable medium includes a computer operation instruction, when a processor executes the computer operation instruction, the computer operation instruction is used to enable the processor to execute the method according to the first aspect or any possible implementation manner of the first aspect.

In a fifth aspect, an embodiment of the present application provides a wireless network service providing system, where the system includes a processor, a memory, and a communication interface, where the memory stores a computer operation instruction, and the processor and the memory are connected with the communication interface through a communication bus; and when the system runs, the processor executes the computer operation instruction stored in the memory, so that the system executes the method according to the first aspect or any possible implementation manner of the first aspect.

Through the method and the system of embodiments of the present application, an area (a first area) where a WLAN is used securely is divided, so that after an object device completes automatic authentication in this area, the object can be directly authorized in a larger area (a second area) to obtain the network service. In this case, both security and convenience of use of the WLAN are considered.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

The following further describes specific implementation manners of the present application in detail with reference to the accompanying drawings and embodiments. The following embodiments are examples, rather than limiting the scope of the present application.

Figure 1:
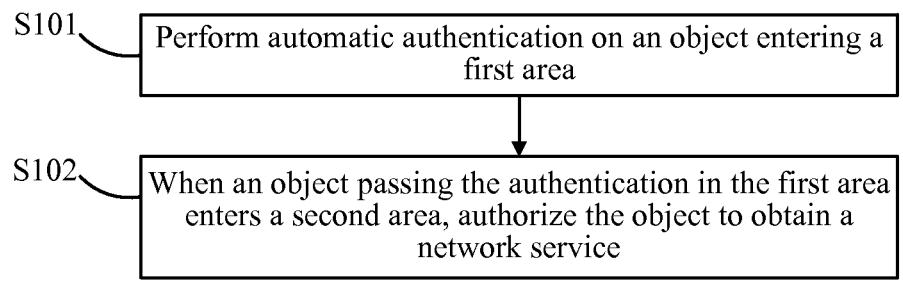
FIG. 1 is a flowchart of a wireless network service providing method according to an embodiment of the present application.

As shown in FIG. 1, an embodiment of the present application provides a wireless network service providing method, and the method includes.

S101: Perform automatic authentication on an object entering a first area.

The object may be any terminal device, such as a mobile phone, a portable computer, a tablet, or a wearable device, that can wirelessly access a WLAN device (such as a WLAN AP), and the authentication is preferably password-free authentication, so that after entering the first area, the object automatically accesses the WLAN covering the first area, and a wireless transmission encryption protocol and encryption password are negotiated with the object, where an negotiated encryption algorithm includes but is not limited to: wired equivalent privacy (Wired Equivalent privacy, WEP), Wi-Fi protected access (WiFi Protected Access, WPA), and WPA2.

S102: When the object passing the authentication in the first area enters a second area, authorize the object to obtain a network service.

In the embodiment of the present application, the second area is a specific network coverage area excluding the first area. The first area may be very small, and does not have a high requirement for positioning accuracy, as long as the first area is determined to be within a controllable secure range, such as a specific area at home/in shopping malls or other business places, and a security checkpoint in the airport, where the specific area may be a living room, a service counter, a checkout counter, a security system, and the like. Correspondingly, the second area may be other areas than the living room in a family, other areas than the service counter/checkout counter/security system in the shopping mall or other business places, or other areas than the security checkpoint in the airport. The first area and the second area may be pre-divided physical spaces, or an actual coverage area of a specific WLAN, and the first area and the second area may be covered by the same or different WLANs. It should be noted that the first area has a smaller area than the second area, and the physical spaces may be areas where a specific device is located or physical spaces where a specific function/action (such as, a payment action, security inspection, and withdrawing money) occurs.

Specifically, according to an access process of the WLAN, the method according to the embodiment of the present application further includes:

S001: Receive an access request.

An object entering the coverage area of the WLAN sends an access request to an access device of the WLAN, where the access request may be a wireless signal transmitted in a specific mode, or a request message obtained through demodulation or decryption on the basis of the wireless signal. In addition, the access request may be attached with a network service request, that is, correspond to a type of a required service, such as a telephone service.

After the access request is received, the method according to the embodiment of the present application further includes:

S002: Determine a location of an object corresponding to the access request.

Any method known in the field can be adopted to determine the location of the object, for example: determine the location of the object according to positioning information fed back by the object, where the positioning information includes but is not limited to: global positioning system (Global Positioning System, GPS) positioning information, assisted GPS (Assisted GPS, A-GPS) positioning information, BeiDou navigation satellite system BDS positioning information, GALILEO positioning system positioning information, and Global Navigation Satellite System (GLONASS) positioning information; determine the location of the object according to motion status information of the object (for example, a motion track of the object is determined according to information, such as a direction and acceleration, obtained from the object, and the location of the object is further analyzed according to the motion track of the object); determine the location of the object according to a transmission distance (an over-the-air transmission delay of the signal is determined by calculating a phase change of the signal in the transmission process, thereby determining the transmission distance) of a signal (including an audio signal) sent by the object; determine the location of the object according to a magnetic field of the location of the object or intensity of the wireless signal. It may also be determined, in a short distance communication manner, such as, Bluetooth, radio frequency identification (Radio Frequency Identification, RFID) and near field communication (Near Field Communication, NFC), that the object is near a device with which the object is in short-distance communication, thereby approximately determining the location of the object.

It should be noted that, according to a specific division of the first area, a manner of determining that an object is located in the first area may be: when a main radio frequency signal of an object is input through a specific signal interface, determining that the object is located in the first area. Specifically, the first area is an area where a specific device is located or a physical space where a specific function/action (such as, a payment action, security inspection, and withdrawing money) occurs, and the signal interface may include but is not limited to an interface connected to any one of the following terminals: a point of sale (Point Of Sale, POS), a mobile phone, a personal digital assistant, a personal computer, a tablet, a handheld dedicated reader, a set top box, an electronic cash register, an automatic teller machine, a public phone booth, and a security system.

After the determining whether an object is located in the first area or the second area in the foregoing manner, the method further includes: if the object is located in the first area, initiating a password-free authentication process for the object, completing automatic authentication, and negotiating a wireless transmission encryption protocol and encryption password with the object. It should be noted that, after automatic authentication, a corresponding object and authentication-related information may be recorded.

For an object entering the second area, the method according to the embodiment of the present application further includes:

S003: Determine whether an object entering the second area passes authentication in the first area.

For an object that enters the second area but does not pass the authentication in the first area, or an object neither in the first area nor in the second area, a request from the object and for accessing a corresponding WLAN may be refused, or authentication may be performed on the object in a conventional authentication manner, such as an authentication manner through a password.

For an object authorized to obtain a network service, the method according to the embodiment of the present application may further include:

S103: Set an authority to obtain a network service for an object.

S104: Provide a corresponding network service according to the authority.

An object accessing a corresponding WLAN will send a network service request to an access device. In the method according to the embodiment of the present application, an authority of an object to obtain a network service is set, so that at least a part of the network service requests is accepted to provide a network service for a corresponding object, for example, some objects may access a local area network and a wide area network, and some objects can only access the wide area network, thereby ensuring security of the local area network. The network service request includes a request for obtaining an IP address through a dynamic host configuration protocol (Dynamic Host Configuration Protocol, DHCP), a Web authentication request, an HTTP service request, and the like.

Correspondingly, the method according to the embodiment of the present application further includes canceling an authorization for an object. Because in the method according to the embodiment of the present application, the location of the object may be determined in real time or periodically, an authorization for an object can be canceled when the object leaves the second area. Or, the authorization for the object is canceled after a preset time period after the object is authorized.

In conclusion, through the method according to the embodiment of the present application, an area (a first area) where a WLAN is used securely is divided, so that after an object device completes automatic authentication in this area, the object can be directly authorized in a larger area (a second area) to obtain the network service. In this case, both security and convenience of use of the WLAN are considered.

A person skilled in the art may understand that, in the foregoing method of specific implementation manners of the present application, sequence numbers of the steps or operations do not imply an execution sequence, and the execution sequence of the steps or operations should be determined according to their functions and internal logic, rather than limiting an implementation process of the implementation manners of the present application.

Figure 2:
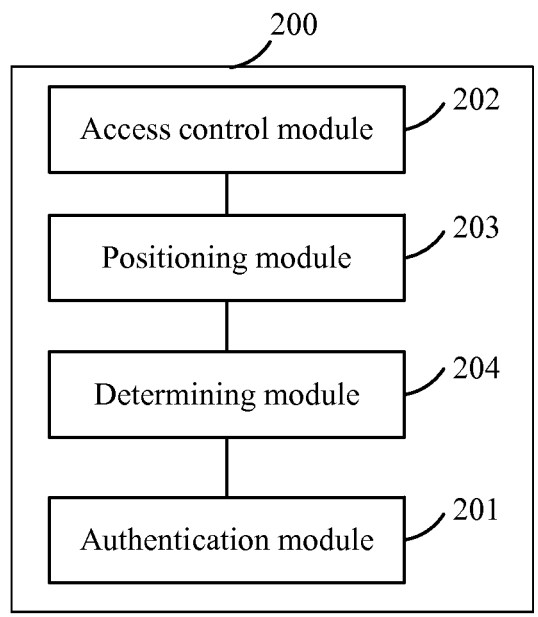
FIG. 2 is a structural block diagram of a wireless network service providing system according to an embodiment of the present application.

As shown in FIG. 2, an embodiment of the present application provides a wireless network service providing system 200, and the system 200 includes: an authentication module 201, configured to perform automatic authentication on an object entering a first area, and authorize the object passing the authentication in the first area to obtain a network service in a second area.

The object may be any terminal device, such as a mobile phone, a portable computer, a tablet, or a wearable device, that can wirelessly access a WLAN device (such as a WLAN AP), and the authentication is preferably password-free authentication, so that after entering the first area, the object automatically accesses the WLAN covering the first area, and a wireless transmission encryption protocol and encryption password are negotiated with the object, where an negotiated encryption algorithm includes but is not limited to: wired equivalent privacy (Wired Equivalent privacy, WEP), Wi-Fi protected access (WiFi Protected Access, WPA), and WPA2.

In the embodiment of the present application, the second area is a specific network coverage area excluding the first area. The first area may be very small, and does not have a high requirement for positioning accuracy, as long as the first area is determined to be within a controllable secure range, such as a specific area at home/in shopping malls or other business places, and a security checkpoint in the airport, where the specific area may be a living room, a service counter, a checkout counter, a security system, and the like. Correspondingly, the second area may be other areas than the living room in a family, other areas than the service counter/checkout counter/security system in the shopping mall or other business places, or other areas than the security checkpoint in the airport. The first area and the second area may be pre-divided physical spaces, or an actual coverage area of a specific WLAN, and the first area and the second area may be covered by the same or different WLANs. It should be noted that the physical spaces may be areas where a specific device is located or physical spaces where a specific function/action (such as, a payment action, security inspection, and withdrawing money) occurs. Correspondingly, when the first area and the second area are covered by a same WLAN, the authentication module 201 may be an access device of the covering wireless network, such as, a wireless router.

The authentication module 201 may further include a first authentication unit and a second authentication unit. The first authentication unit is configured to perform automatic authentication on an object entering the first area; and the second authentication unit is configured to authorize the object passing the authentication in the first area to obtain the network service in the second area. When the first area and the second area are covered by different WLANs, the first authentication unit and the second authentication unit may be respectively located on access devices of different WLANs. Of course, no matter whether the first authentication unit and the second authentication unit are covered by the same WLAN or different WLANs, the access device of the covering WLAN may also be other devices than the authentication module 201.

Specifically, according to an access process of the WLAN, the system 200 according to the embodiment of the present application further includes: an access control module 202, configured to receive an access request; and a positioning module 203, configured to: after the access control module 202 receives the access request, determine a location of an object corresponding to the access request.

An object entering the coverage area of the WLAN sends an access request to an access device of the WLAN, where the access request may be a wireless signal transmitted in a specific mode, or a request message obtained through demodulation or decryption on the basis of the wireless signal. In addition, the access request may be attached with a network service request, that is, correspond to a type of a required service, such as a telephone service.

Any method known in the field can be adopted for the positioning module 203 to determine the location of the object, for example: determine the location of the object according to positioning information fed back by the object, where the positioning information includes but is not limited to: GPS positioning information, A-GPS positioning information, BDS positioning information, GALILEO positioning information, and GLONASS positioning information; determine the location of the object according to motion status information of the object (for example, a motion track of the object is determined according to information, such as a direction and acceleration, obtained from the object, and the location of the object is further analyzed according to the motion track of the object); determine the location of the object according to a transmission distance (an over-the-air transmission delay of the signal is determined by calculating a phase change of the signal in the transmission process, thereby determining the transmission distance) of a signal (including an audio signal) sent by the object; determine the location of the object according to a magnetic field of the location of the object or intensity of a wireless signal. it may also be determined, in a short distance communication manner, such as, Bluetooth, RFID, and NFC, that the object is near a device with which the object is in short-distance communication, thereby approximately determining the location of the object.

It should be noted that, according to a specific division of the first area, a manner of determining that an object is located in the first area may be: when a main radio frequency signal of an object is input through a specific signal interface, determining that the object is located in the first area. Specifically, the first area is an area where a specific device is located or a physical space where a specific function/action (such as, a payment action, security inspection, and withdrawing money) occurs, and the signal interface may include but is not limited to an interface connected to any one of the following terminals: a POS, a mobile phone, a personal digital assistant, a personal computer, a tablet, a handheld dedicated reader, a set top box, an electronic cash register, an automatic teller machine, a public phone booth, and a security system. The signal interface may be a part of the system 200 according to the embodiment of the present application.

After the determining whether an object is located in the first area or the second area: if the object is located in the first area, the authentication module 201 initiates a password-free authentication process for the object, completes automatic authentication, and negotiates a wireless transmission encryption protocol and encryption password with the object. It should be noted that, after automatic authentication, a corresponding object and authentication-related information may be recorded.

The system 200 according to the embodiment of the present application further includes a determining module 204, configured to determine whether an object entering the second area passes the authentication performed by the authentication module 201 in the first area.

For an object that enters the second area but does not pass the authentication in the first area, or an object neither in the first area nor in the second area, the system 200 according to the embodiment of the present application may refuse a request from the object and for accessing a corresponding WLAN, or authenticate the object in a conventional authentication manner, such as, an authentication manner through a password.

In addition, in the system 200 according to the embodiment of the present application, the authentication module 201 is further configured to set an authority to obtain a network service for an object that passes the authentication, and provide a corresponding network service according to the authority. When the first authentication module 201 includes the first authentication unit and the second authentication unit, and the first authentication unit and the second authentication unit are located in a different device, and the first authentication unit and/or the second authentication unit sets an authority to obtain a service provided by the WLAN for the object that passes the authentication.

An object accessing a corresponding WLAN will send a network service request to an access device. The system 200 according to the embodiment of the present application accepts, by setting an authority to obtain a network service for an object, at least a part of the network service requests to provide a network service for a corresponding object, for example, some objects may access a local area network and a wide area network, while some objects can only access the wide area network, thereby ensuring security of the local area network. The network service request includes a request for obtaining an IP address through a DHCP, a Web authentication request, an HTTP service request, and the like.

Correspondingly, the authentication module 201 is further configured to cancel an authorization for an object. Because, the system 200 according to the embodiment of the present application may determine the location of the object in real time or periodically, the authentication module 201 may cancel the authorization for the object when the object leaves the second area; or the authentication module 201 may cancel the authorization for the object after a preset time period after the object is authorized.

In conclusion, through the system according to the embodiment of the present application, an area (a first area) where a WLAN is used securely is divided, so that after an object device completes automatic authentication in this area, the object can be directly authorized in a larger area (a second area) to obtain the network service. In this case, both security and convenience of use of the WLAN are considered.

The following further describes the method and the system according to the embodiments of the present application with a specific example.

Figure 3:
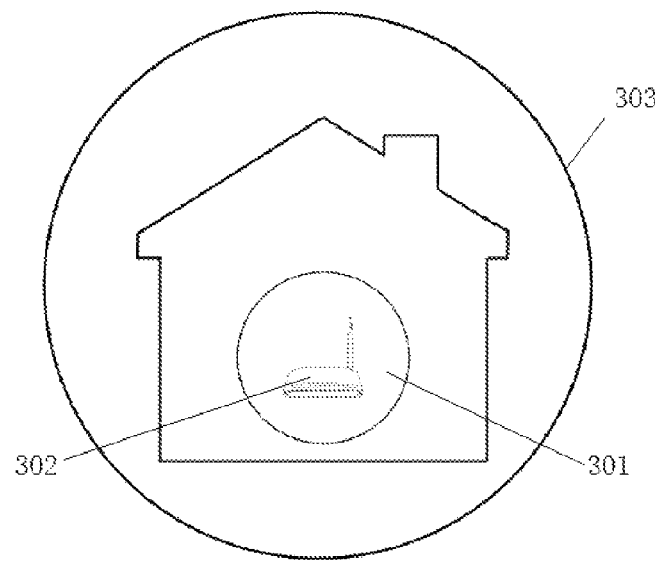
FIG. 3 is a schematic diagram showing an application scenario of a wireless network service providing method and system according to an embodiment of the present application.

As shown in FIG. 3, in a first example, a first area is a living room 301 (a small circle area) of a family, and a WLAN access device of the family, that is, a wireless router 302, is set in the living room 301; a second area 303 is a big circle area (and may also be limited to a physical space limited by the house of the family) covered by the wireless router 302 and excluding the living room 301. When the wireless router 302 detects that an object enters the living room 301, the wireless router 302 automatically implements authentication on the object, so that the object can use a service provided by a corresponding WLAN in the second area 303. An authorization for the object is released after the object leaves the second area 303. In this way, even for a guest paying the first visit, a complex process of inputting a password is not needed. At the same time, continuity of data transmission can be ensured within a larger area.

Of course, the wireless router 302 may record, in a trusty list and by maintaining the trusty list, an ID of an object that passes the authentication in the living room 301, and in this way, after the object re-enters the second area 303, it is authorized automatically to access the WLAN and use a service provided by the WLAN.

In a second example, the first area is a checkout counter of a café, and the second area is a physical space covered by the restaurant. After an object has a successful consumption in the POS of the checkout counter of the café, it is determined that the object has obtained an authorization in the first area. Then, the object is authorized to obtain the network service in other areas of the physical space covered by the restaurant.

Figure 4:
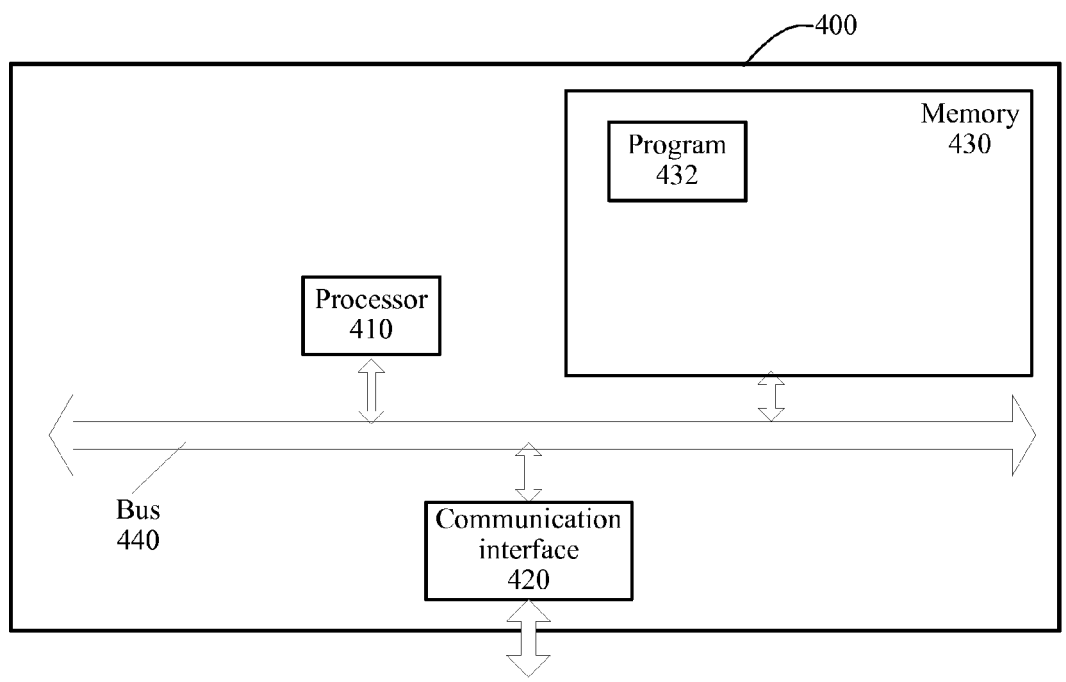
FIG. 4 is another structural block diagram of a wireless network service providing system according to an embodiment of the present application.

As shown in FIG. 4, an embodiment of the present application further provides a wireless network service providing system 400, and the embodiment of the present application does not specifically limit the implementation of the wireless network service providing system 400. As shown in FIG. 4, the apparatus may include: a processor (processor) 410, a communication interface (Communications interface) 420, a memory (memory) 430, and a communication bus 440.

The processor 410, the communication interface 420, and the memory 430 implement communication between each other through the communication bus 440.

The communication interface 420 is configured to communicate with a network element, such as, a client.

The processor 410 is configured to execute a program 432, and specifically execute the method embodiment shown in FIG. 1.

Specifically, the program 432 may include a program code, and the program code includes a computer operation instruction.

The processor 410 may be a central processing unit CPU, or an application specific integrated circuit ASIC (Application Specific Integrated Circuit), or is configured as one or more integrated circuits for implementing the embodiments of the present application.

The memory 430 is configured to store the program 432. The memory 430 may include a high-speed Random Access Memory (RAM) memory, and may also include a non-volatile memory (non-volatile memory), such as, at least one disk memory. The program 432 may specifically enable the system 400 to execute: performing automatic authentication on an object entering a first area; and when the object passing the authentication in the first area enters a second area, authorizing the object to obtain a network service.

For specific implementations of the units in the program 432, reference may be made to corresponding steps, operations or units in the embodiments of the present application, and the details are not described herein again.

A person of ordinary skill in the art may be aware that, units, operations and steps in the examples described in the embodiments disclosed in this specification may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in the form of a software functional unit and sold or used as an independent product, the functions may be stored in a computer-readable storage medium. Based on such an understanding, the technical solutions of the present application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps or operations of the method described in the embodiment of the present application. The foregoing storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing implementation manners are merely used for describing the various embodiments, rather than limiting any scope of the present application. A person of ordinary skill in the art may make various changes and modifications without departing from the spirit and scope of the present application, and therefore, all equivalent technical solutions shall belong to the scope of the present invention, and the protection scope of the present application shall be represented by the claims.

What is claimed is:

1. A method, comprising:
   performing, by a system comprising a processor, authentication on an object entering a first area, wherein the object is determined to be entering the first area based on determining a location of the object, wherein the determining the location is performed based on information obtained from a signal received from the object, and wherein the signal is determined to have been generated in response to an input received by the system via a determined signal interface, wherein the first area is a physical space where a specific function or action occurs, the specific function or action being intended for a purpose other than authentication of the object to a network service, wherein the object obtains automatic authorization to a network service in the first area after the object successfully completes the specific function or action in the first area; and
   in response to the object passing the authentication in the first area being determined to have entered a second area, authorizing the object to obtain a network service in the second area.

2. The method according to claim 1, wherein the second area is a defined network coverage area excluding the first area.

3. The method according to claim 1, further comprising: receiving an access request via the determined signal interface.

4. The method according to claim 1, wherein the signal interface comprises an interface connected to a mobile phone.

5. The method according to claim 1, wherein the signal interface comprises an interface connected to at least one of a point-of-sale terminal, a personal digital assistant, a personal computer, a tablet, a handheld dedicated reader, a set top box, an electronic cash register, an automatic teller machine, a public phone booth, or a security system.

6. The method according to claim 1, wherein the determining the location comprises determining the location of the object according to positioning information of the object.

7. The method according to claim 6, wherein the positioning information comprises at least one of Global Positioning System positioning information, Assisted Global Positioning System positioning information, BeiDou navigation satellite system positioning information, Galileo positioning system information, or Global Navigation Satellite System positioning information.

8. The method according to claim 1, wherein the determining the location comprises determining the location of the object according to motion status information of the object.

9. The method according to claim 1, wherein the determining the location comprises determining the location of the object according to a transmission distance of the signal sent by the object.

10. The method according to claim 1, wherein the determining the location comprises determining the location of the object according to a magnetic field of the location of the object or an intensity of the signal, wherein the signal is a wireless signal.

11. The method according to claim 1, further comprising:
determining whether the object entering the second area passes the authentication in the first area.

12. The method according to claim 1, further comprising:
setting an authority to obtain the network service for the object.

13. The method according to claim 12, further comprising:
providing the network service according to the authority.

14. The method according to claim 1, further comprising:
canceling the authorizing of the object to obtain the network service.

15. The method according to claim 14, wherein the canceling comprises in response to the object being determined to have left the second area, canceling the authorizing of the object.

16. The method according to claim 14, wherein the canceling comprises canceling the authorizing of the object after a preset time period expires after the authorizing of the object is initiated.

17. The method according to claim 1, wherein the authentication in the first area is a password-free authentication.

18. A system, comprising:
a memory to store executable components; and
a processor, coupled to the memory, that executes or facilitates execution of the executable components, the executable components comprising:
in response to receiving, by the processor, a signal from an object, determining, by the processor, an object location based on information determined from the signal, wherein the signal is received by the processor via a signal interface; and
an authentication module configured to perform authentication on the object entering a first area, and authorize the object passing the authentication in the first area to obtain a network service in a second area, wherein the object is determined to enter the first area based on the object location, wherein the first area is a physical space where a specific function or action occurs, the specific function or action being intended for a purpose other than authentication of the object to a network service, wherein the object obtains automatic authorization to a network service in the first area after the object successfully completes the specific function or action in the first area.

19. The system according to claim 18, wherein the executable components further comprise:
an access control module configured to receive an access request signal from the object; and
a positioning module configured to determine an updated object location corresponding to the access request signal.

20. The system according to claim 19, wherein the access request signal is a main radio frequency signal and wherein, in response to the main radio frequency signal of the object being determined to be input through the signal interface, the positioning module is further configured to determine the updated object location.

21. The system according to claim 20, wherein the system comprises the signal interface, and the signal interface comprises an interface connected to at least one of a point-of-sale terminal, a mobile phone, a personal digital assistant, a personal computer, a tablet, a handheld dedicated reader, a set top box, an electronic cash register, an automatic teller machine, a public phone booth, or a security system.

22. The system according to claim 19, wherein the positioning module is further configured to determine the updated object location according to positioning information of the object.

23. The system according to claim 20, wherein the executable components further comprise an Assisted Global Positioning System (A-GPS) positioning module configured to obtain positioning information of the object.

24. The system according to claim 19, wherein the positioning module is further configured to determine the updated object location according to motion status information of the object.

25. The system according to claim 19, wherein the positioning module is further configured to determine the updated object location according to a transmission distance of the access request signal sent by the object.

26. The system according to claim 19, wherein the positioning module is further configured to determine the updated object location according to a magnetic field of the location of the object or an intensity of the access request signal, wherein the access request signal is a wireless signal.

27. The system according to claim 18, wherein the executable components further comprise a determining module configured to determine whether the object entering the second area passes the authentication in the first area.

28. The system according to claim 18, wherein the authentication module is further configured to set an authority to obtain the network service for the object.

29. The system according to claim 28, wherein the authentication module is further configured to provide the network service according to the authority.

30. The system according to claim 18, wherein the authentication module is further configured to cancel the authorization of the object.

31. The system according to claim 30, wherein the authentication module is further configured to cancel the authorization of the object in response to the object being determined to leave the second area.

32. The system according to claim 30, wherein the authentication module is further configured to cancel the authorization of the object after a preset time period after the authorization of the object.

33. The system according to claim 18, wherein the authentication module comprises:
a first authentication unit configured to perform the authentication on the object entering the first area; or
a second authentication unit configured to authorize the object passing the authentication in the first area to obtain the network service in the second area.

34. The system according to claim 33, wherein the first authentication unit is implemented in a first device and the second authentication unit is implemented in a second device different from the first device.

35. A non-transitory computer readable storage device comprising executable instructions that, in response to execution, cause a system comprising a processor to perform operations, comprising:

in response to receiving a signal from an object via a signal interface, determining a location of the object and determining that the object is entering a first area;

authenticating the object in response to the object being determined to be entering the first area, wherein the first area is a physical space where a specific function or action occurs, the specific function or action being intended for a purpose other than authentication of the object to a network service, wherein the object obtains automatic authorization to a network service in the first area after the object successfully completes the specific function or action in the first area; and in response to the object passing the authenticating in the first area being determined to have entered a second area, authorizing the object to obtain a network service in the second area.

36. The computer readable storage device of claim 35, wherein the operations further comprise:

receiving an access request via the signal interface; and determining another location of the object corresponding to the access request.

37. A system, comprising:

a processor, coupled to a memory that stores executable instructions, that executes or facilitates execution of the executable instructions to at least:

perform authentication on an object that is determined to be entering a first area based on a location of the object, wherein the location of the object is determined based on information obtained from a signal received via a signal interface, wherein the first area is a physical space where a specific function or action occurs, the specific function or action being intended for a purpose other than authentication of the object to a network service, wherein the object obtains automatic authorization to a network service in the first area after the object successfully completes the specific function or action in the first area; and authorize the object to obtain a network service in a second area in response to the object being determined to be authenticated to the first area and in response to the object being determined to have entered the second area.

* * * * *